US005692722A

United States Patent [19]

Lundagårds

[11] Patent Number: 5,692,722

[45] Date of Patent: Dec. 2, 1997

[54] LOCKING DEVICE

[76] Inventor: Ulf Lundagårds, Vevlinge, PL 1097, Bollnäs S-821 00, Sweden

[21] Appl. No.: 481,293

[22] PCT Filed: Dec. 2, 1993

[86] PCT No.: PCT/SE93/01038

§ 371 Date: Jun. 8, 1995

§ 102(e) Date: Jun. 8, 1995

[87] PCT Pub. No.: WO94/13913

PCT Pub. Date: Jun. 23, 1994

[30] Foreign Application Priority Data

Dec. 9, 1992 [SE] Sweden .................................. 9203700

[51] Int. Cl.$^6$ ........................................ F16M 13/00

[52] U.S. Cl. .............................. 248/553; 70/58; 403/331; 248/224.61; 248/500; 248/551

[58] Field of Search .................... 70/58, 62; 248/223.41, 248/224.61, 295.11, 297.21, 500, 506, 551, 553, 600; 403/315, 320, 331, 353

[56] References Cited

U.S. PATENT DOCUMENTS

| | | | |
|---|---|---|---|
| 4,024,737 | 5/1977 | McInturff . | |
| 4,047,686 | 9/1977 | Porter | 70/58 X |
| 4,083,620 | 4/1978 | Burgin | 248/551 X |
| 4,228,974 | 10/1980 | Yates | 70/58 X |
| 4,367,979 | 1/1983 | Milligan | 403/353 X |
| 4,406,386 | 9/1983 | Rasor et al. | 248/297.21 X |
| 4,691,891 | 9/1987 | Dionne . | |
| 5,058,843 | 10/1991 | Koster | 248/223.41 |
| 5,116,015 | 5/1992 | Gassaway | 248/553 |
| 5,154,456 | 10/1992 | Moore et al. . | |
| 5,601,273 | 2/1997 | Avganim | 248/551 |
| 5,605,316 | 2/1997 | Kelley | 248/551 |

FOREIGN PATENT DOCUMENTS

| | | | |
|---|---|---|---|
| 0105675 | 4/1984 | European Pat. Off. . | |
| 438174 | 4/1985 | Sweden . | |
| 2153902 | 8/1985 | United Kingdom . | |
| WO85/03735 | 8/1985 | WIPO | 70/58 |

*Primary Examiner*—Carl D. Friedman
*Assistant Examiner*—Kevin D. Wilkens
*Attorney, Agent, or Firm*—Tarolli, Sundheim, Covell, Tummino & Szabo

[57] ABSTRACT

A locking device (1) for locking an article (2) relative to a support (3), wherein the locking device (1) includes at least two locking members (4, 6) having grooves (8, 9), anchored to the support (3) and at least two locking members (5, 7), having projections (10, 11), anchored to the article (2). The locking members (5, 7) are brought to cooperate with the locking members (4, 6) by inserting the projections (10, 11) into the grooves (8, 9) and displacing the projections (10, 11) therein in a direction of displacement (F) whereby at least two locking members (4, 5) cooperating with each other can be locked relative to each other by locking means (14) to prevent relative displacement of the locking members (4, 5) in the direction of displacement (F). The locking members (4, 6) are designed and provided such that the groove (8) of one locking member (4) is open in a side direction (S1) relative to the direction of displacement (F), while the groove (9) of locking member (6) is open in the opposite side direction (S2) relative to the direction of displacement (F). The locking members (5, 7) are designed such that the projection (11) of locking member (7) is directed in a side direction (Sl) relative to the direction of displacement (F), while the projection (10) of locking member (5) is directed in the opposite side direction (S2). The projections (10, 11) protrude from the inside and outward into the corresponding grooves (8, 9).

11 Claims, 8 Drawing Sheets

LOCKING DEVICE

The present invention relates to a locking device for locking on object relative to a support, which locking device includes at least two locking members anchored to the support and at least two locking members anchored to the object, whereby two of said locking members have grooves and the two other locking members have projections, whereby the locking members having the projections can be brought to cooperate with the locking members having the grooves by inserting said projections into said grooves and displace said projections therein in a direction of displacement and whereby at least two locking members cooperating with each other can be locked relative to each other by means of at least one locking means to prevent relative displacement of said locking members in the direction of displacement.

From SE patent specification 8400972-9 (438 174), GB patent specification 2 153 902 and U.S. Pat. No. 4,024,737, locking devices of the above type are already known.

A problem with these prior art constructions is however, that the locking members can not be seen if large objects, e.g. computers, are locked by means of said members. This because large objects hide the locking members and it can be difficult and time consuming to find the entrance to the locking members on the support with the locking members on the object, since the object is often heavy and must be carried when looking for the correct position.

The object of the present invention has been to eliminate this drawback and at locking devices of the above type permit quick looking of the object without difficulty by one person. This is arrived at according to the invention by providing the abovementioned locking device with the characterizing features of claim 1.

By providing the locking device with these characterizing features, the locking members of the object can be brought in engagement with the locking members on the support by placing the object in position, whereafter it is easy to bring the locking members of the object in locking positions relative to the locking members on the support by displacing said object somewhat when it is placed in position.

The invention will be further described below with reference to the accompanying drawings, in which FIG. 1 is a perspective view of a locking device according to the invention, the locking members of which are mounted on a support and on an object in the form of a computer;

Figure 1:
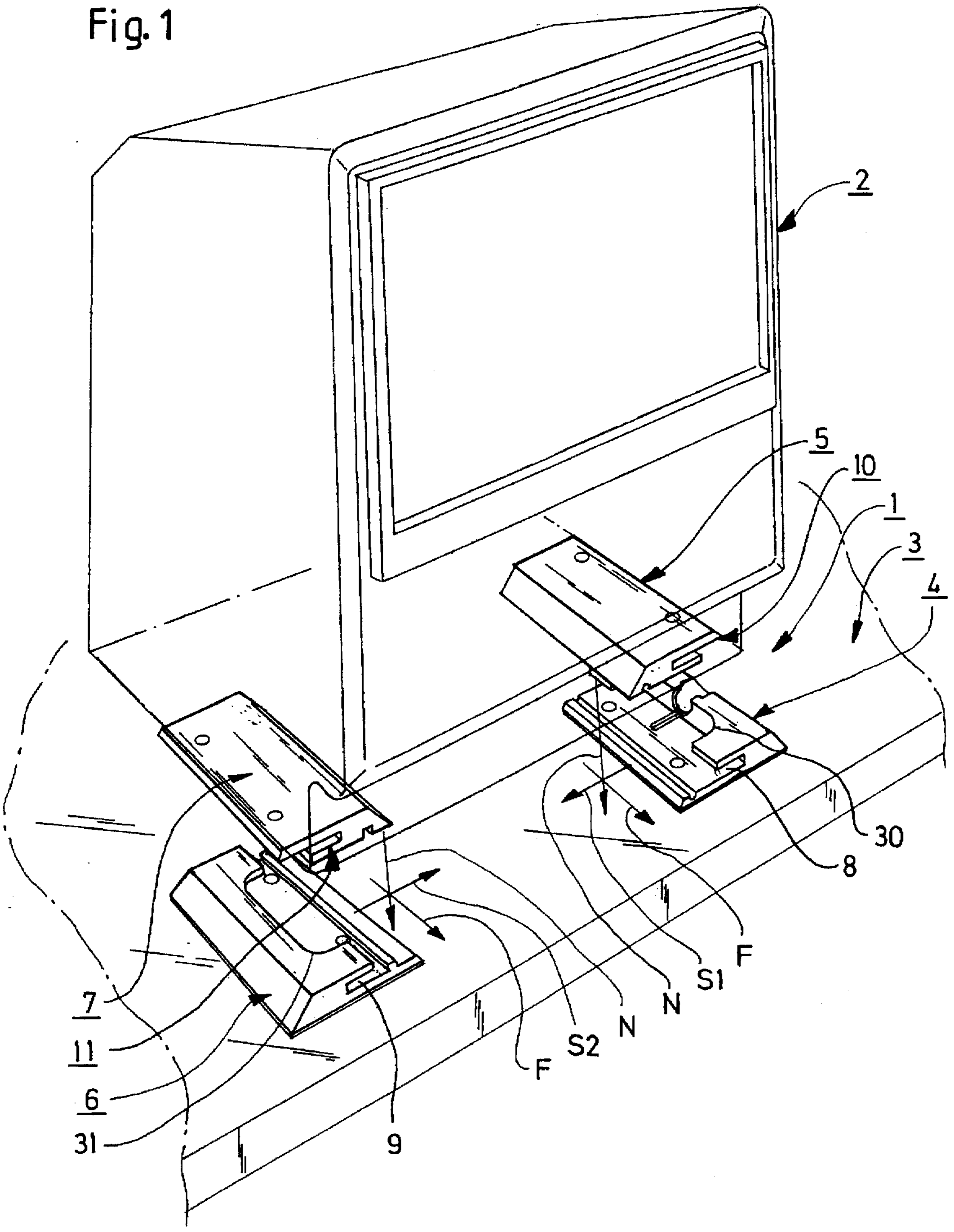

The locking device 1 illustrated in the drawings is adapted to lock an object 2, e.g. a computer or another valuable object, relative to a support 3, e.g. a table top or a floor. The locking device 1 includes two locking members 4 and 6 anchored to the support 3 and two locking members 5 and 7 anchored to the object 2. The locking members 4–7 can be anchored to the support 3 and object 2 by means of screw joints (not shown) and/or special tape with a large holding or retaining capacity and/or a binder with a large retaining capacity in order to prevent unauthorized removal of the locking members 4–7.

The locking members 4 and 6 respectively, have grooves 8, 9 and the locking members 5 and 7 respectively, have projections 10, 11, whereby said grooves 8, 9 and projections 10, 11 are designed such that said projections 10, 11 can be moved into said grooves 8, 9 and fit therein. Furthermore, the locking members 5, 7 on the object 2 are located so relative to the locking members 4. 6 on the support 3 that by displacing the object relative to the support 3, it is possible to insert the projections 10, 11 of the locking members 5, 7 into the grooves 8, 9 of the looking members 4, 6 and then along said grooves in the direction of displacement F. Hereby, two pairs 12 and 13 respectively, of locking members are defined, of which one pair 12 consists of locking members 4 end 5 and the other pair 13 of locking members 6 and 7. The locking members in at least one of said pairs 12 and/or 13 of locking members (e.g. the looking members 4, 5 in pair 12), can be locked relative to each other by means of at least one locking means 14 (see e.g. FIG. 3) so that said locking members 4, 5 are locked relative to each other such that they thereafter can not be displaced in relation to each other in the direction of displacement F, which means that the object 2 can not be moved relative to the support 3.

The locking members 4, 6 on the support 3 are also designed and provided such that either the groove 8 of one locking member 4 is open in a side direction S1 relative to the direction of displacement F, while the groove 9 of the other locking member 6 is open in the opposite side direction S2 relative to the direction of displacement F. As an alternative thereto, the locking members 4, 6 on the support 3 can be designed and provided such that the projection of one locking member is directed in one side direction S1 relative to the direction of displacement F, while the projection of the other locking member is directed in the opposite side direction S2 relative to the direction of displacement F. This alternative is not shown in the drawings, but means that the locking members 5, 7 provided on the object 2 instead are mounted on the support 3, while the locking members 4, 6 on the support 3 instead are provided on the object 2.

The locking members 5, 7 on the object 2 are designed and provided such that either the projection 10 of one locking member 5 is directed in a side direction S2 relative to the direction of displacement F, while the projection 11 of the other locking member 7 is directed in the opposite side direction S1 relative to the direction of displacement F, or that the locking members 5, 7 on the object 2 are designed and mounted such that the groove of one locking member is open in one side direction S1 relative to the direction of displacement F, while the groove of the other locking member is open in the opposite side direction S2 relative to the direction of displacement F. This alternative is neither shown in the drawings, but means that the locking members 4, 6 provided on the support 3 instead can be mounted on the object 2, while the locking members 5, 7 provided on the object 2 instead can be mounted on the support 3.

Figure 3:
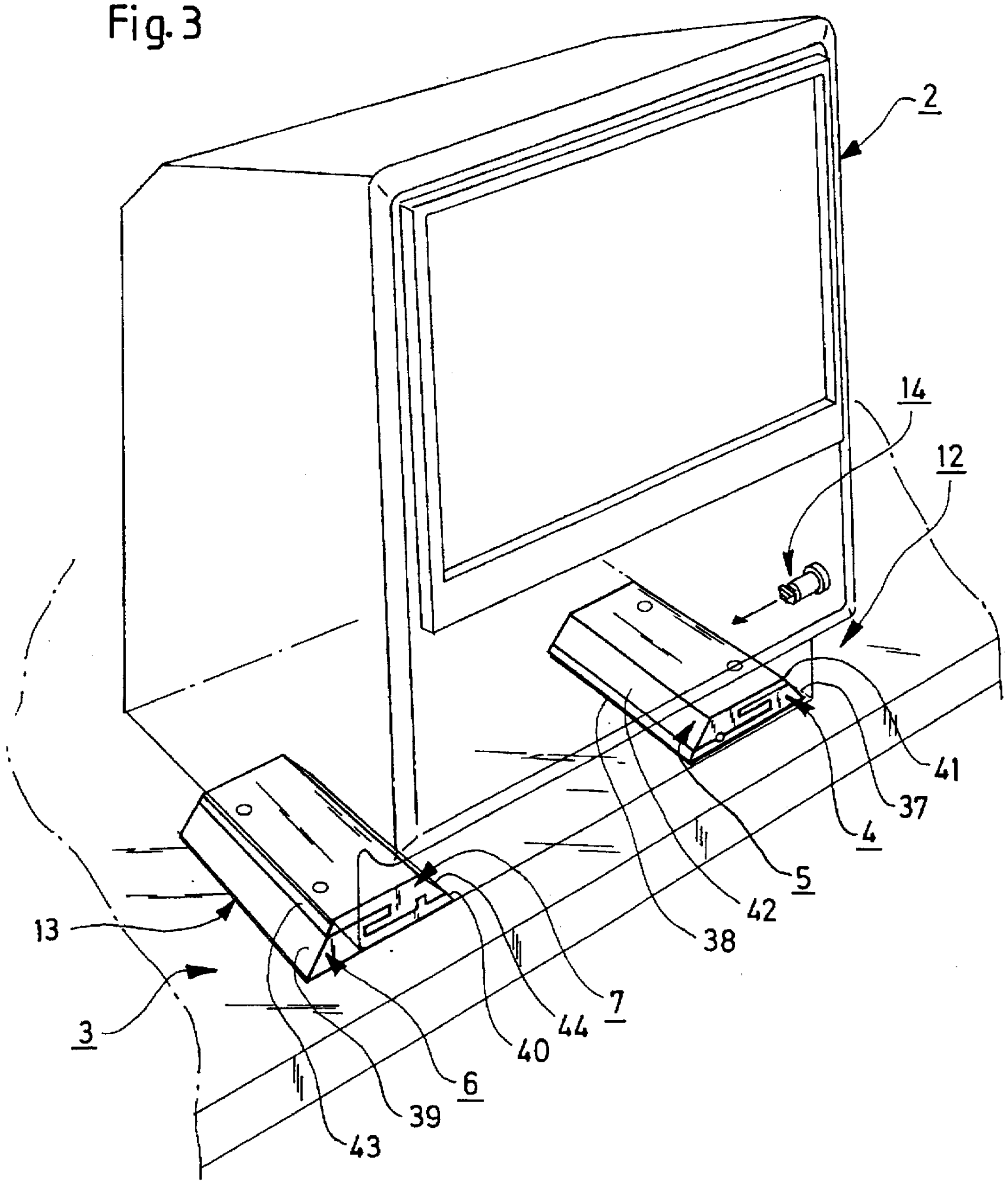
FIG. 3 is a perspective view of the locking device of FIG. 1 when the locking members on the computer are moved together with the locking members on the support such that said members can be locked against displacement by means of a locking means.
Figure 4:
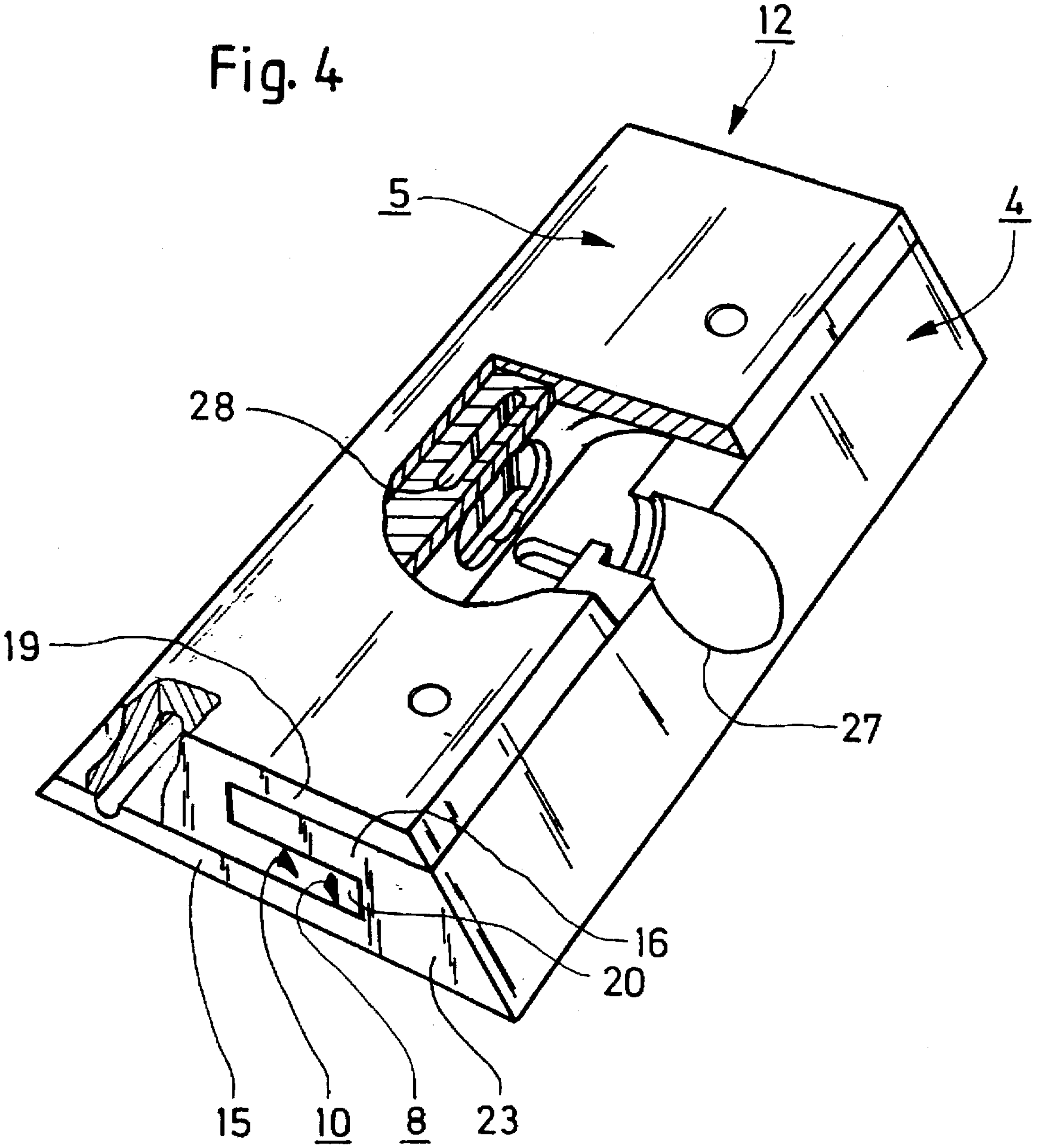
FIG. 4 is a perspective view, partly in section, showing two locking members of the locking device moved together but not locked to each other.
Figure 5:
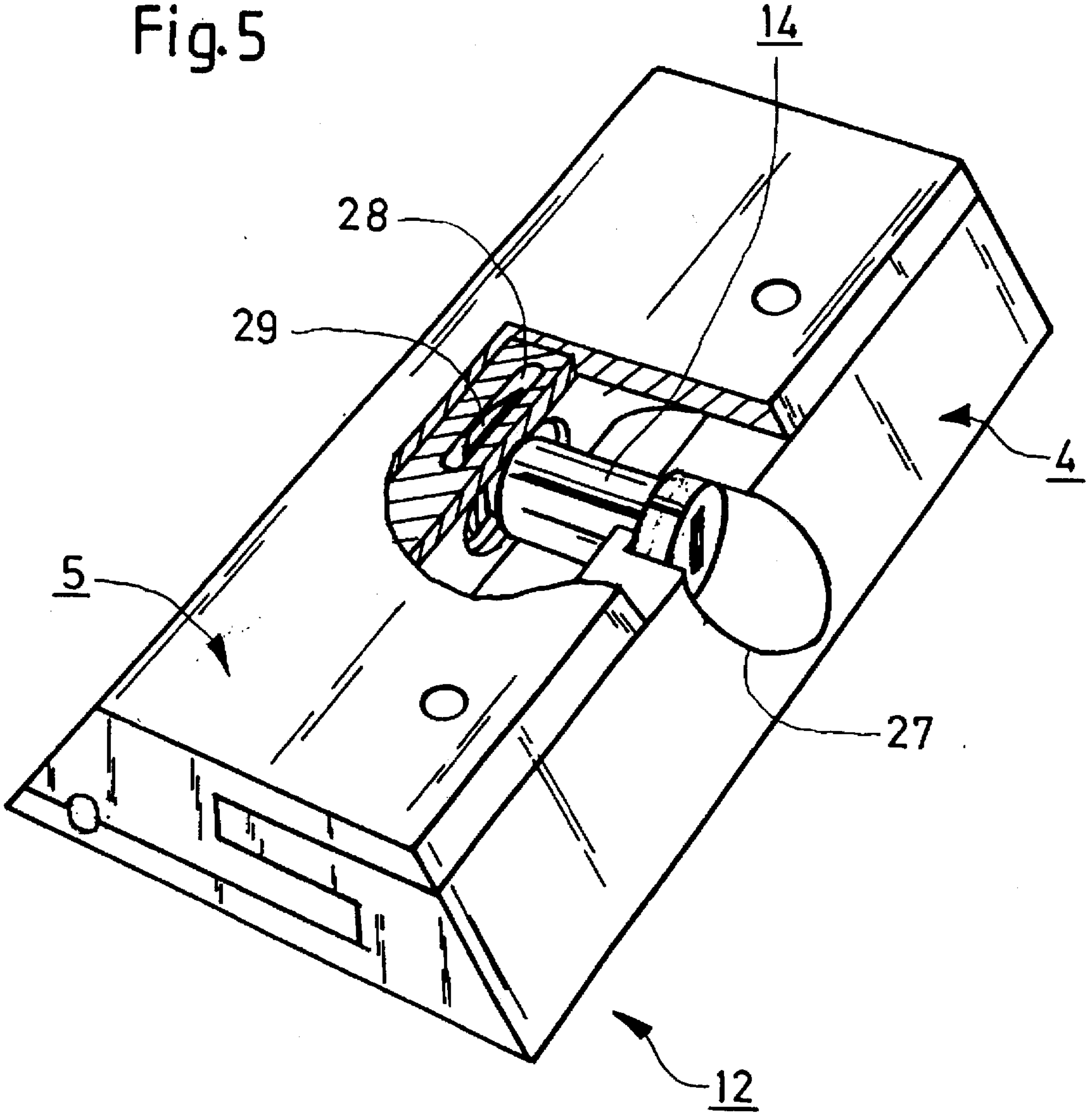
FIG. 5 is a perspective view, partly in section, of the same looking members as in FIG. 4 moved together and locked to each other.
Figure 6:
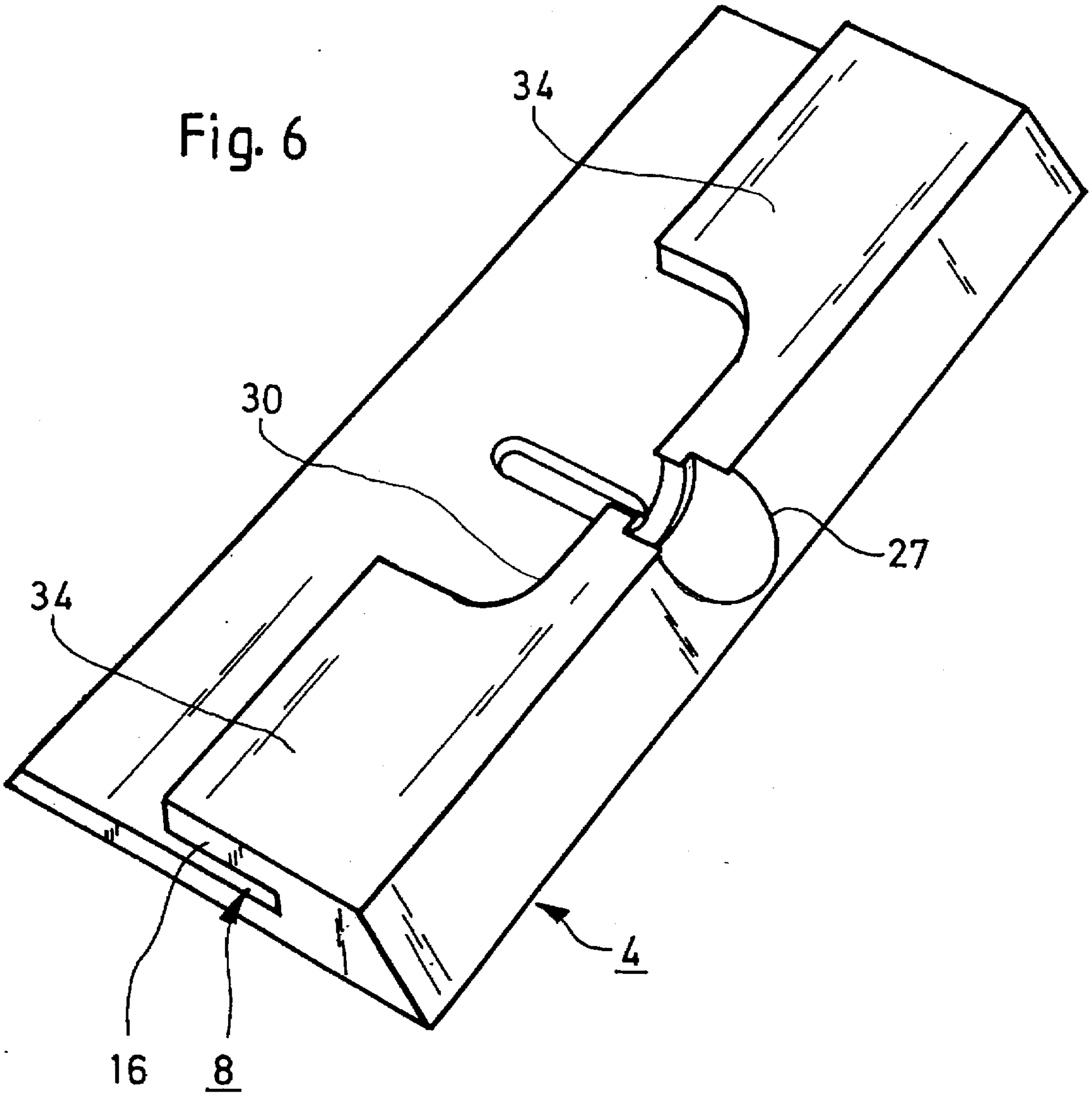
FIG. 6 is a perspective view of one of the locking members from the previous figures.
Figure 7:
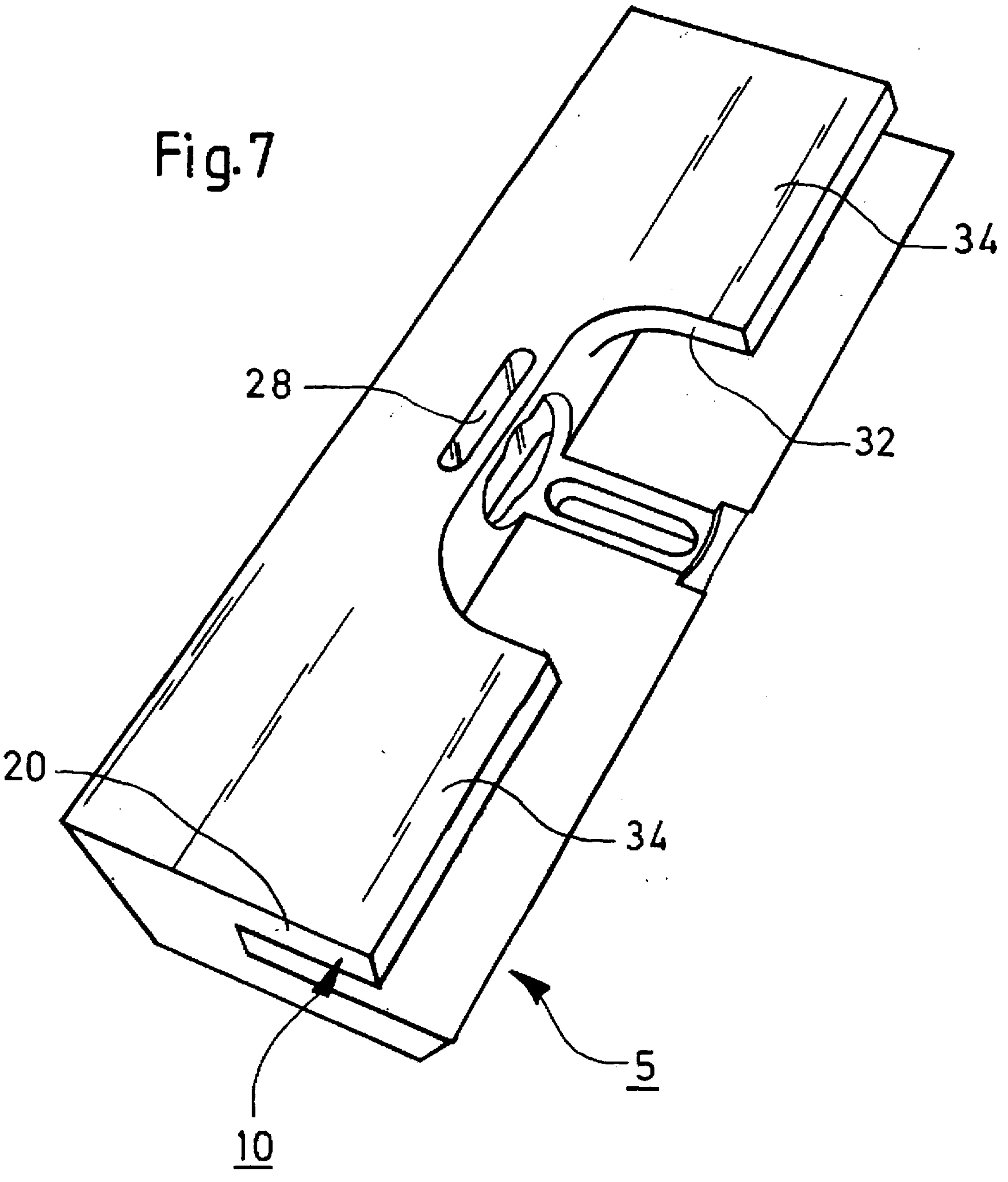
FIG. 7 is a perspective view of another of said locking members from the previous figures.
Figure 8:
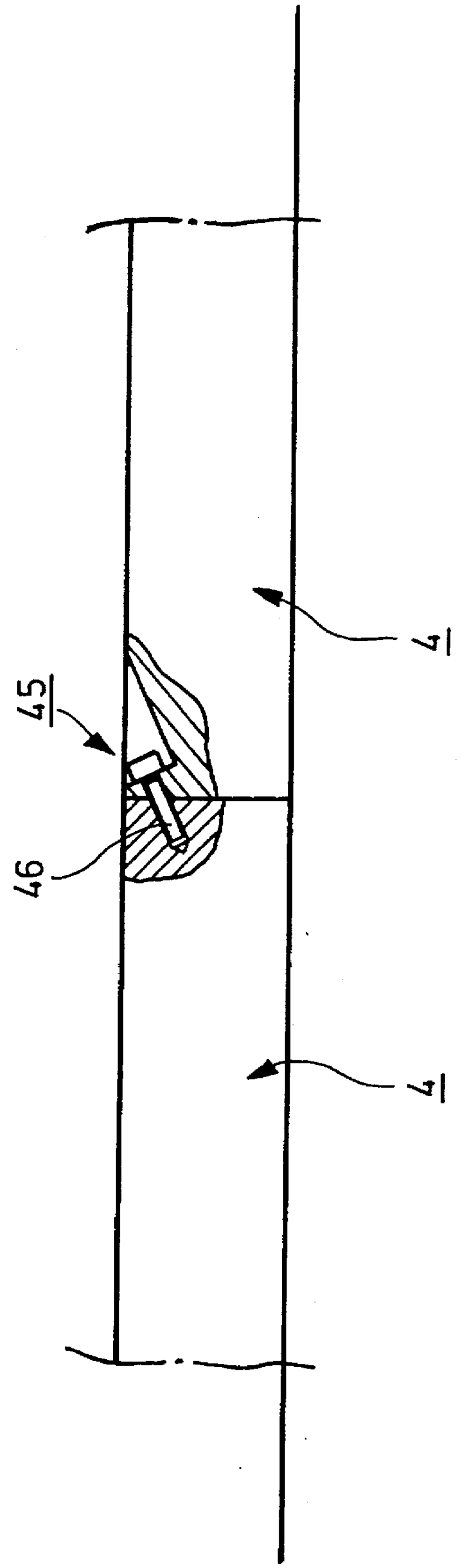
FIG. 8 is a perspective view of locking members located in series and connected to each other.

The various locking members 4–7 are also adapted to each other such that the projections of the locking members on the object or the support, seen in said side directions S1, S2, either protrude from the outside and inwards into or from the inside and outwards into the corresponing grooves in the locking members on the support 3 or the object 2 (see e.g. FIG. 3).

Each locking member 4–7 is preferably U-shaped in cross section and the shanks 15, 16 on the locking member 4 are e.g. directed in the side direction S1 towards the locking member 6, while the shanks 17, 18 on the locking member 6 are directed in the opposite side direction S2 towards the locking member 4 (as is illustrated in the drawings). Alternatively, the shanks 15, 16 on the locking member 4 can be directed from the locking member 6 and the shanks 17, 18 on the locking member 6 can be directed from the locking member 4.

The shanks 19, 20 on the locking member 5 provided on the object 2 are e.g. directed in the side direction S2 from the other locking member 7 on the object 2, while the shanks 21, 22 on the other locking member 7 provided on the object 2 are directed in the opposite side direction S1 from the locking member 5. Alternatively, the shanks 19, 20 of the locking member 5 can be directed towards the locking member 7 and the shanks 21, 22 of the locking member 7 be directed towards the locking member 5.

The shanks 15, 16 and 17, 18 respectively, of the locking members 4, 6 define, seen in the side directions S1, S2, grooves 8, 9 that are open towards each other, while one of the shanks 19–22 on each of the locking members 5, 7 provided on the object 2 define, seen in said side directions S1, S2, projections 10, 11 which are directed from each other and which engage the grooves 8, 9 of the locking members 4, 6.

Alternatively, the shanks 15–18 on the locking members 4, 6 on the support 3 can instead be directed from each other so that the grooves 8, 9 instead are open in a direction from each other. The shanks 19–22 on the locking members 5, 7 on the object 2 are then instead directed towards each other such that one of these shanks can engage said grooves 8, 9.

As a further alternative, the projections can instead be defined by the locking members provided on the support 3 and the grooves in the locking members on the object 2.

Each locking member 4–7 preferably is U-shaped in cross section. The locking member 4 on the support 3 is located such that its web portion 23 is situated farthest away from the locking member 6 and the shanks 15, 16 protruding from this web portion 23 are directed towards said locking member 6. The locking member 6 is placed such that the web portion 24 thereof is located farthest away from the locking member 4 and the shanks 17, 18 protruding from said web portion 24 are directed towards the locking member 4. Alternatively, the position of the locking members 4, 6 can be turned around. The locking member 5 on the object 2 is located such that its web portion 25 is situated closest to the locking, member 7 and the shanks 19, 20 protruding from said web portion are directed from the locking member 7. The locking member 7 is located such that its web portion 26 is situated closest to the locking member 5 and the shanks 21, 22 protruding from said web portion 26 are directed from the looking member 5.

Since the shanks of the locking members 4–7 are directed as defined above, grooves 8, 9 are provided in the locking members 4, 6 mounted on the support, which grooves are open towards each other in said side directions S1, S2, end projections 10, 11 are provided in the locking members 5, 7 located on the object 2, which projections are directed away from each other, in said side directions S1, S2, as is illustrated in the drawings, or are the grooves in the locking members 4, 6 on the support 3 instead directed away from each other while the projections on the looking members 5, 7 on the object 2 are directed towards each other.

On the locking members 4 and 6 respectively, the shanks 15 and 17 respectively, define anchoring portions or parts of anchoring portions through which said locking members 4, 6 is adapted to be mounted on the support 3. This can be done in various ways, e.g. by means of screws (not shown) which are not accessible for undoing when locking by means of the locking members has occured and/or by means of a special tape (not shown) with a very good adhering or retaining capacity and which are neither accessible for unauthorized removal.

In the web portion 23 of the locking member 4 there is provided a recess 27 into which the locking means 14 can be inserted and in the web portion 25 of the locking member 5 there is provided a recess 28 into which a locking tooth 29 on the locking means 14 can be inserted. By inserting the locking means 14 into the recess 27 of the locking member 4 end turn the key (not shown), the locking tooth 29 is pivoted into the recess 28 of the locking member 5, whereby the locking device is locked by preventing displacement of the locking members 4, 5 relative to each other in the direction of displacement F.

Figure 2:
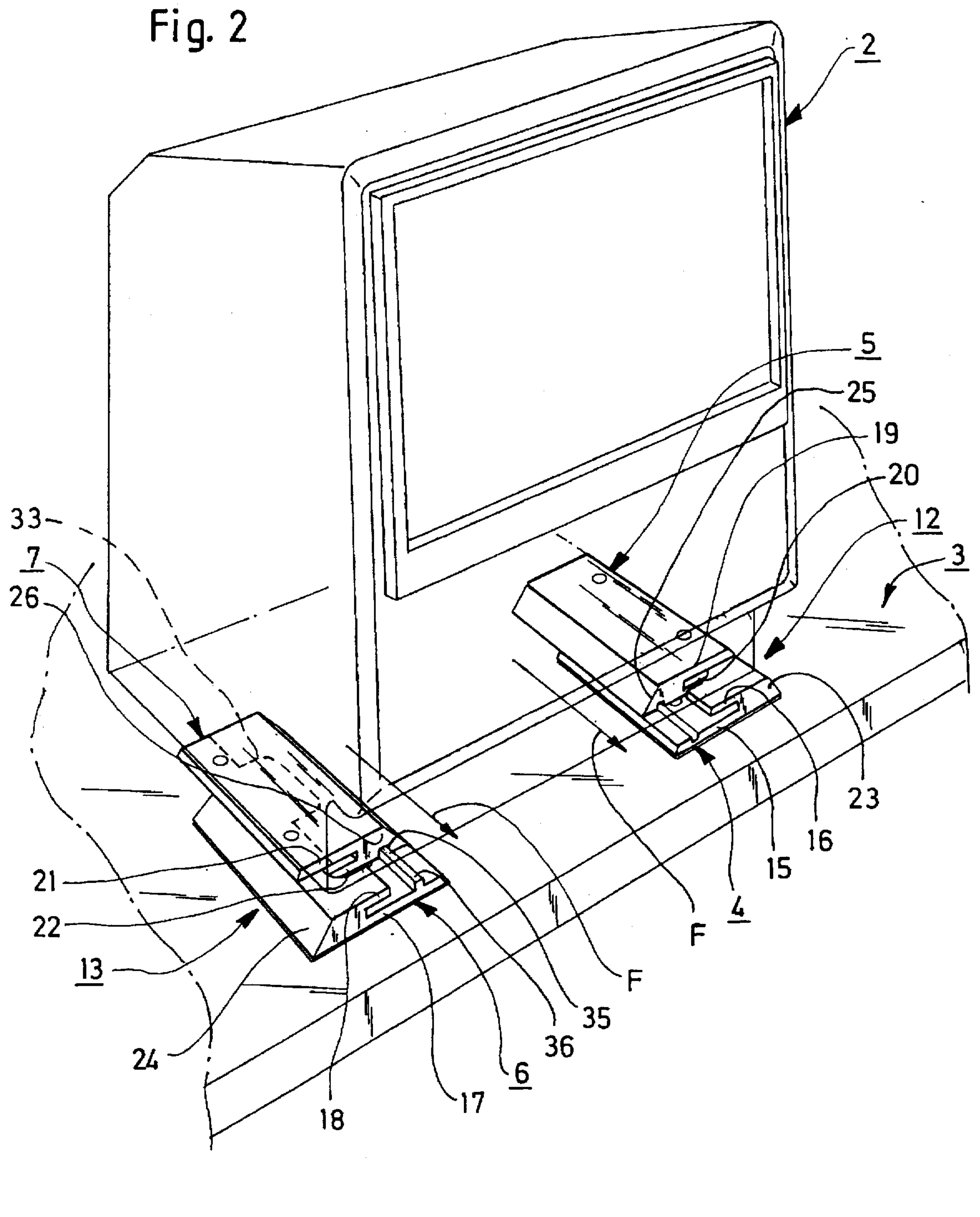
FIG. 2 is a perspective view of the locking device of FIG. 1 when the locking members on the computer engage the locking members on the support.

In order to facilitate mounting especially when the locking members are hidden when they are moved together, they can be designed such that the locking members 5, 7 on the object 2 can be moved together with the locking members 4, 6 on the support 3 (or vice versa) in a connecting direction N (see FIG. 1) transverse to the direction of displacement F until the locking members 5, 7 on the object 2 from above engage the locking members 4, 6 on the support 3 in positions partially overlapping each other (see FIG. 2) in such a way that the projections 10, 11 on the locking members 5, 7 are situated in inserting positions adjacent to the grooves 8, 9 of the locking members 4, 6 so that said locking members 4, 6 guide the looking members 5, 7 for guiding the projections into the grooves 8, 9 such that the object 2 and thus, its locking members 5, 7 are displaced in the direction of displacement F relative to the locking members 4, 6 on the support 3.

Preferably, the locking members 4–7 have recesses 30–33 in the shanks 16, 18, 20, 22 which permit bringing together of the locking members 5, 7 with the locking members 4, 6 in the connecting direction N. These recesses 30–33 are preferably designed as edge recesses in the outer shanks 16, 18, 20, 22 and portions 34 of said shanks on both sides of said edge recesses are dimensioned such that such portions 34 on the locking members 5, 7 on the object 2 can be moved through the recesses 30, 31 in the looking members 4, 6 on the support 3.

At least the looking member 7 can be provided with a guide groove 35 which extends in the direction of displacement F and at least the locking member 6 can be provided with a guide projection 36 which also extends in the direction of displacement F. Preferably, the guide groove 35 is provided beside the projection 11 in the looking member 7 and the guide projection 36 is preferably provided beside the groove 9 in the locking member 6. Furthermore, the guide projection 36 engage the guide groove 35 when the locking members engage each other.

In order to render it more difficult to release or disconnect the looking members 4–7, said members can be provided with inclined outer surfaces 37–44 on two opposing sides, which surfaces are located such that two locking members cooperating with each other, e.g. each pair 12, 13 of locking members, have a shape which tapers from the support 3 in a direction towards the object 2.

The locking members 4–7 can be provided with devices 45 for connecting the corresponding locking members in series and eventually for locking these locking members to each other. These devices can e.g. comprise a screw 46 which protrudes through a hole in a locking member and which is screwed into an adjacent locking member.

For release or disconnection of at first hand locking members which are anchored or fixed with tape or similar fixing or anchoring means, at least one of the locking members 4–7 can be provided with at least one recess (not shown) into which a releasing or disconnecting tool (not shown) for releasing or disconnecting the locking member can be inserted so that one can pivot the locking member therewith in a plane which is parallel with the surface onto which the locking member is attached until the tape or similar loosens. This recess is accessible for the leasing tool preferably only when two locking members engaging each other, are separated from each other.

Hereby, the recess can e.g. be provided in a shank 21 in a looking member 7 which when locked is brought in engagement with a locking member 6. By inserting the disconnecting tool into this recess and pivoting the locking member 7 e.g. back and forth in the plane of the support 3, the tape or similar fixing or holding the looking member 6 is brought to loosen, since the guide groove 35 and the guide projection 36 inserted therein for engagement ensure transfer of the pivoting force of the releasing tool from the locking member 7 to the locking member 6. The locking member 4 can be released or loosened in a similar way if said member is designed such that the pivoting force from a releasing or disconnecting tool can be transferred thereto. Reversed, the locking members 5 and 7 can be released or loosened by means of locking members 4 and 6 if these latter members are provided with recesses for releasing or disconnecting tools and the design of the locking members is such that the pivoting force can be transferred therebetween.

The locking device according to the invention is not limited to the embodiment described above and shown in the drawings, but may vary within the scope of the following claims. As an example of various alternatives, it should be mentioned that the support 3 can be a table top, a floor, a cabinet or some other suitable support and the object 2 can be a data processing computer installation or some other object which need to be locked relative to the support. There may be more than two locking members on the support and the object and more than one pair of locking members can be provided with one or more looking means. Each locking member in a pair of said members may eventually comprise a guide groove (as is shown at the locking members 4, 5 in the pair 12 of said members). When required, a separate guide rod can be placed in said guide grooves, which rod engages both guide grooves simultaneously, i.e. the guide rod has the same function as the guide projection 36 on the locking member 6. In many instances, the locking members in the pair 12 of locking members are prevented from relative movement effective by the locking means 14 between the locking members, while the locking members in the other pair 13 thereof sometimes need to be guided relative to each other with an extra guiding device 35, 36 as is shown in the drawings.

I claim:

1. Locking device for locking an article relative to a support, the locking device including a first locking member adapted to be anchored to the support and a second locking member adapted to be anchored to the article, the first locking member having a groove and the second locking member having a projection, the second locking member adapted to be brought to cooperate with the first locking member by inserting the projection into the groove and displacing the projection in the groove in a direction of displacement, the locking members adapted to be lockable relative to each other by locking means to prevent relative displacement of the locking members, characterized in that the groove of the first locking member is open in a first side direction transverse to the direction of displacement, the projection of the second locking member is directed in an opposite second side direction relative to the direction of displacement, such that the projection on the second locking member protrudes into the groove in the first locking member, further characterized in that at least one of the locking members is provided with a recess which permits moving together the second locking member with the first member in a connecting direction transverse to the direction of displacement and transverse to the side direction until the second locking member engages the first locking member in an orientation which partially overlaps each other in such a way that the second locking member thereafter is displaceable in the direction of displacement relative to the first locking member until the second locking member is locked to the first locking member.

2. Locking device for locking an article relative to a support, the locking device including a first and a second locking member adapted to be anchored to one of the support and article and a third and a fourth locking member adapted to be anchored to the other of the support and article, the first and second locking members having grooves and the third and fourth locking members having projections, the third and fourth locking members adapted to be brought to cooperate with the first and second locking members, respectively, by inserting the projections into the grooves and displacing the projections in the grooves in a direction of displacement such that the first and third locking members cooperate to form a first pair of locking members and the second and fourth locking members cooperate to form a second pair of locking members, the first and third locking members adapted to be lockable relative to each other by at least one locking means to prevent relative displacement of the first and third locking members, characterized in that the groove of the first locking member is open in a first side direction transverse to the direction of displacement, while the groove of the second locking member is open in an opposite second side direction transverse to the direction of displacement, wherein the projection of the third locking member extends in the second side direction, while the projection on the fourth locking member extends in the first side direction, further characterized in that at least two of the locking members are provided with recesses which permit moving together the third and fourth locking members with the first and second locking members, respectively, in a connecting direction transverse to the direction of displacement and transverse to the first and second side directions until the third and fourth locking members engage the first and second locking members, respectively, in positions which partially overlap each other in such a way that the third and fourth locking members thereafter are displaceable in the direction of displacement relative to the first and second locking members until the third and fourth locking members are locked to each of the first and second locking members, respectively.

3. Locking device according to claim 2, characterized in that each locking member has an essentially u-shaped cross section, the first locking member having a first pair of shanks extending in the first side direction, the second locking member having a second pair of shanks extending in the second side direction, the third locking member having a third pair of shanks extending in the second side direction, the fourth locking member having a fourth pair of shanks extending in the first side direction, whereby each of the locking members have web portions which cooperate with a corresponding one of said pairs of shanks to define the grooves, which are open towards each other, and the projections, which are directed from each other, respectively.

4. Locking device according to claim 3, characterized in that each of the pairs of shanks, on each locking member, comprises a first shank and a second shank, each of the first shanks defining parts of anchoring portions through which the locking member is adapted to be mounted, the first and second shanks on first and second locking members defining the grooves with the first and second shanks on the third and fourth locking members defining the projections, the projections adapted to be fitted into the grooves, whereby the first shanks defining the parts of the anchoring portions are wider than the second shanks on the locking members.

5. Locking device according to claim 3, characterized in that the web portion in the first locking member is provided with a first opening into which the locking means is insertable and that the web portion in the third locking member is provided with a second opening into which a locking tooth on the locking means is insertable.

6. Locking device according to claim 2, characterized in that the projections on the third and fourth locking members are adapted to be located in inserting positions adjacent to the grooves in the first and second locking members after the third and fourth locking members have been brought together with the first and second locking members in the connecting direction, such that the first and second locking members guide the third and fourth locking members into the grooves when the third and fourth locking members are displaced in the direction of displacement relative to the first and second locking members.

7. Locking device according to claim 2, characterized in that the fourth locking member is provided with a guide groove which extends in the direction of displacement while the second locking member has a guide projection which extends in the direction of displacement, wherein the guide projection is adapted to be adjacent to the projection on the second locking member and the guide groove is adapted to be adjacent to the groove on the fourth locking member, whereby the guide groove and the guide projection engage each other when the projection and groove of the second and fourth locking members engage each other.

8. Locking device according to claim 2, whereby each of the locking members are adapted to be attachable to the support or to the article by attaching means.

9. Locking device for locking an article relative to a support, the locking device including a first and a second locking member adapted to be anchored to one of the support and article and a third and a fourth locking member adapted to be anchored to the other of the support and article, the first and second locking members having grooves and the third and fourth locking members having projections, the third and fourth locking members adapted to be brought to cooperate with the first and second locking members, respectively, by inserting the projections into the grooves and displacing the projections in the grooves in a direction of displacement such that the first and third locking members cooperate to form a first pair of locking members and the second and fourth locking members cooperate to form a second pair of locking members, the first and third locking members adapted to be lockable relative to each other by at least one locking means to prevent relative displacement of the first and third locking members, characterized in that the groove of the first locking member is open in a first side direction transverse to the direction of displacement, while the groove of the second locking member is open in an opposite second side direction transverse to the direction of displacement, wherein the projection of the third locking member extends in the second side direction, while the projection on the fourth locking member extends in the first side direction, further characterized in that at least two of the locking members are provided with recesses which permit moving together the third and fourth locking members with the first and second locking members, respectively, in a connecting direction transverse to the direction of displacement and transverse to the first and second side directions, the recesses being designed as edge recesses in outer shanks of the two locking members, a portion of each outer shank being so dimensioned that each portion is movable in the connecting direction through the recess in a corresponding locking member.

10. Locking device for locking an article relative to a support, the locking device including a first and a second locking member adapted to be anchored to one of the support and article and a third and a fourth locking member adapted to be anchored to the other of the support and article, the first and second locking members having grooves and the third and fourth locking members having projections, the third and fourth locking members adapted to be brought to cooperate with the first and second locking members, respectively, by inserting the projections into the grooves and displacing the projections in the grooves in a direction of displacement such that the first and third locking members cooperate to form a first pair of locking members and the second and fourth locking members cooperate to form a second pair of locking members, the first and third locking members adapted to be lockable relative to each other by at least one locking means to prevent relative displacement of the first and third locking members, characterized in that the groove of the first locking member is open in a first side direction transverse to the direction of displacement, while the groove of the second locking member is open in an opposite second side direction transverse to the direction of displacement, wherein the projection of the third locking member extends in the second side direction, while the projection on the fourth locking member extends in the first side direction, further characterized in that the locking members are provided with means for connecting and locking corresponding locking members in series to each other.

11. Locking device for locking an article relative to a support, the locking device including a first and a second locking member adapted to be anchored to one of the support and article and a third and a fourth locking member adapted to be anchored to the other of the support and article, the first and second locking members having grooves and the third and fourth locking members having projections, the third and fourth locking members adapted to be brought to cooperate with the first and second locking members, respectively, by inserting the projections into the grooves and displacing the projections in the grooves in a direction of displacement such that the first and third locking members cooperate to form a first pair of locking members and the second and fourth locking members cooperate to form a second pair of locking members, the first and third locking members adapted to be lockable relative to each other by at least one locking means to prevent relative displacement of the first and third locking members, characterized in that the groove of the first locking member is open in a first side direction transverse to the direction of displacement, while the groove of the second locking member is open in an opposite second side direction transverse to the direction of displacement, wherein the projection of the third locking member extends in the second side direction, while the projection on the fourth locking member extends in the first side direction, characterized in that each of the locking members have opposing sides having inclined outer surfaces which are located such that each of the pairs of locking members have a shape which tapers from the support in a direction towards the article.

* * * * *